United States Patent
Hidaka et al.

(10) Patent No.: US 9,954,415 B2
(45) Date of Patent: Apr. 24, 2018

(54) ROTOR FOR BRUSHLESS MOTOR

(71) Applicant: DENSO CORPORATION, Kariya, Aichi-pref. (JP)

(72) Inventors: Yuuji Hidaka, Kariya (JP); Masaya Ootake, Kariya (JP); Kiyoshi Nagata, Kariya (JP)

(73) Assignee: DENSO CORPORATION, Kariya (JP)

( * ) Notice: Subject to any disclaimer, the term of this patent is extended or adjusted under 35 U.S.C. 154(b) by 167 days.

(21) Appl. No.: 14/914,785

(22) PCT Filed: Aug. 21, 2014

(86) PCT No.: PCT/JP2014/004288
§ 371 (c)(1),
(2) Date: Feb. 26, 2016

(87) PCT Pub. No.: WO2015/029387
PCT Pub. Date: Mar. 5, 2015

(65) Prior Publication Data
US 2016/0211719 A1   Jul. 21, 2016

(30) Foreign Application Priority Data
Aug. 30, 2013   (JP) .................................. 2013-179630

(51) Int. Cl.
*H02K 1/27* (2006.01)
*H02K 7/04* (2006.01)
(Continued)

(52) U.S. Cl.
CPC ................. *H02K 7/04* (2013.01); *H02K 1/02* (2013.01); *H02K 1/2733* (2013.01); *H02K 5/12* (2013.01)

(58) Field of Classification Search
CPC .. H02K 1/02; H02K 1/04; H02K 1/27; H02K 1/273; H02K 1/2733; H02K 1/28;
(Continued)

(56) References Cited

U.S. PATENT DOCUMENTS 4,564,777 A * 1/1986 Senoo .................... H02K 1/278
  310/156.22
6,765,319 B1 * 7/2004 Thompson ............ H01F 1/0578
  310/156.08
(Continued)

FOREIGN PATENT DOCUMENTS

JP   60167667 A * 8/1985 ......... H02K 15/0012
JP   61-262062     11/1986
(Continued)

OTHER PUBLICATIONS

International Search Report for PCT/JP2014/004288, dated Nov. 11, 2014, 4 pages.

*Primary Examiner* — Tran Nguyen
(74) *Attorney, Agent, or Firm* — Nixon & Vanderhye P.C.

(57) ABSTRACT

A permanent magnet of a rotor core of a rotor includes a first recess and a second recess, which are formed in an outer wall to correct a dynamic balance of the rotor. The permanent magnet is a bonded magnet that is formed by molding a mixture material, which is a mixture of resin and magnetic powder. The first recess and the second recess are formed at the time of molding the permanent magnet. Furthermore, the first recess and the second recess are formed at two axial ends, respectively, of the permanent magnet.

8 Claims, 12 Drawing Sheets

(51) Int. Cl.
*H02K 1/02* (2006.01)
*H02K 5/12* (2006.01)

(58) Field of Classification Search
CPC .. H02K 1/30; H02K 1/34; H02K 7/04; H02K 7/14; H02K 15/03; H02K 15/12; F02M 37/048; F02M 37/08; F04D 5/002; F04D 13/064; F04B 17/00; F04C 29/045; F04C 23/008; F04C 18/0215
See application file for complete search history.

(56) References Cited

U.S. PATENT DOCUMENTS

| | | |
|---|---|---|
| 2005/0074343 A1 | 4/2005 | Naito |
| 2007/0052310 A1* | 3/2007 | Sakai .................. F02M 37/048 310/87 |
| 2012/0038240 A1 | 2/2012 | Asai et al. |
| 2012/0098359 A1 | 4/2012 | Morozumi |

FOREIGN PATENT DOCUMENTS

| | | | |
|---|---|---|---|
| JP | 4-168944 | 6/1992 | |
| JP | 5-70173 | 9/1993 | |
| JP | 11-18380 | 1/1999 | |
| JP | 11-38346 | 2/1999 | |
| JP | 2000-270532 | 9/2000 | |
| JP | 2008178233 A * | 7/2008 | .............. H02K 1/27 |
| JP | 2013-17303 | 1/2013 | |

* cited by examiner

ROTOR FOR BRUSHLESS MOTOR

CROSS REFERENCE TO RELATED APPLICATION

This application is the U.S. national phase of International Application No. PCT/JP2014/004288 filed on Aug. 21, 2014, which designated the U.S. and is based on and incorporates herein by reference Japanese Patent Application No. 2013-179630 filed on Aug. 30, 2013.

TECHNICAL FIELD

The present disclosure relates to a rotor for a brushless motor used in a fuel pump.

BACKGROUND ART

There is known a fuel pump that includes an impeller, which is rotatable in a pump chamber, and a motor, which generates a drive force to rotate the impeller. The fuel pump pumps fuel of a fuel tank to an internal combustion engine through rotation of the impeller. For example, the fuel pump recited in the Patent Literature 1 uses a brushed motor. A cross section of one end portion of a shaft of a rotor is configured into a D-shape to join the one end portion of the shaft to the impeller in a manner that enables transmission of rotation therebetween. In the rotor, which has the one end portion configured into the D-shape, a dynamic balance of the rotor is corrected through a cutting process for cutting corresponding part of a rotor core.

Lately, due to the implementation of the high performance of the permanent magnet through use of a rare-earth magnet, such as a neodymium magnet, use of a brushless motor in place of the brushed motor as the motor of the fuel pump has been proposed. In a case where the rotor of the brushless motor is of a permanent magnet type, there is used a bonded magnet, which is formed by resin having magnetic powder held in the resin, or a magnet, which is formed by coating a sintered magnetic body with resin.

However, in the case where the rotor core is cut to correct the dynamic balance, a magnetic part of the permanent magnet is externally exposed to cause deterioration in a fuel resistance performance of the rotor.

CITATION LIST

Patent Literature

PATENT LITERATURE 1: JP2012-065535A (corresponding to US2012/0038240A1)

SUMMARY OF INVENTION

The present disclosure is made in view of the above point. Thereby, it is an objective of the present disclosure to provide a rotor of a brushless motor, which is used in a fuel pump and has been corrected for a dynamic balance without deteriorating a fuel resistance performance of the rotor.

A rotor of a brushless motor of the present disclosure is used for a fuel pump and includes a shaft and a rotor core. A cross-section of one end portion of the shaft located at an axial end of the shaft has a non-circular shape. The rotor core is configured into a tubular form and is securely fitted to the shaft. The rotor core includes a permanent magnet that has a plurality of magnetic poles, which are arranged one after another in a circumferential direction. The permanent magnet includes at least one balance correcting portion, which is in a form of a recess or a projection for correcting a dynamic balance of the rotor and is formed in an outer wall of the permanent magnet. The at least one balance correcting portion is formed by molding.

With the above-described construction, the dynamic balance of the rotor can be correcting without cutting the permanent magnet. For example, in a case where the permanent magnet is a bonded magnet, the at least one balance correcting portion is simultaneously formed at the time of molding the bonded magnet. In the case where the permanent magnet is formed by coating a sintered magnetic body with a protective film made of resin, the at least one balance correcting portion is formed simultaneously at the time of molding the protective film. Therefore, it is possible to avoid the exposure of the magnetic portion by cutting the permanent magnet. Thereby, it is possible to provide the rotor that has been corrected for the dynamic balance without deteriorating the fuel resistance performance of the rotor.

DESCRIPTION OF EMBODIMENTS

Various embodiments of the present disclosure will be described with reference to the accompanying drawings. In the following discussion of the embodiments, similar components will be indicated by the same reference numerals and will not be described redundantly for the sake of simplicity.

First Embodiment

Figure 1:
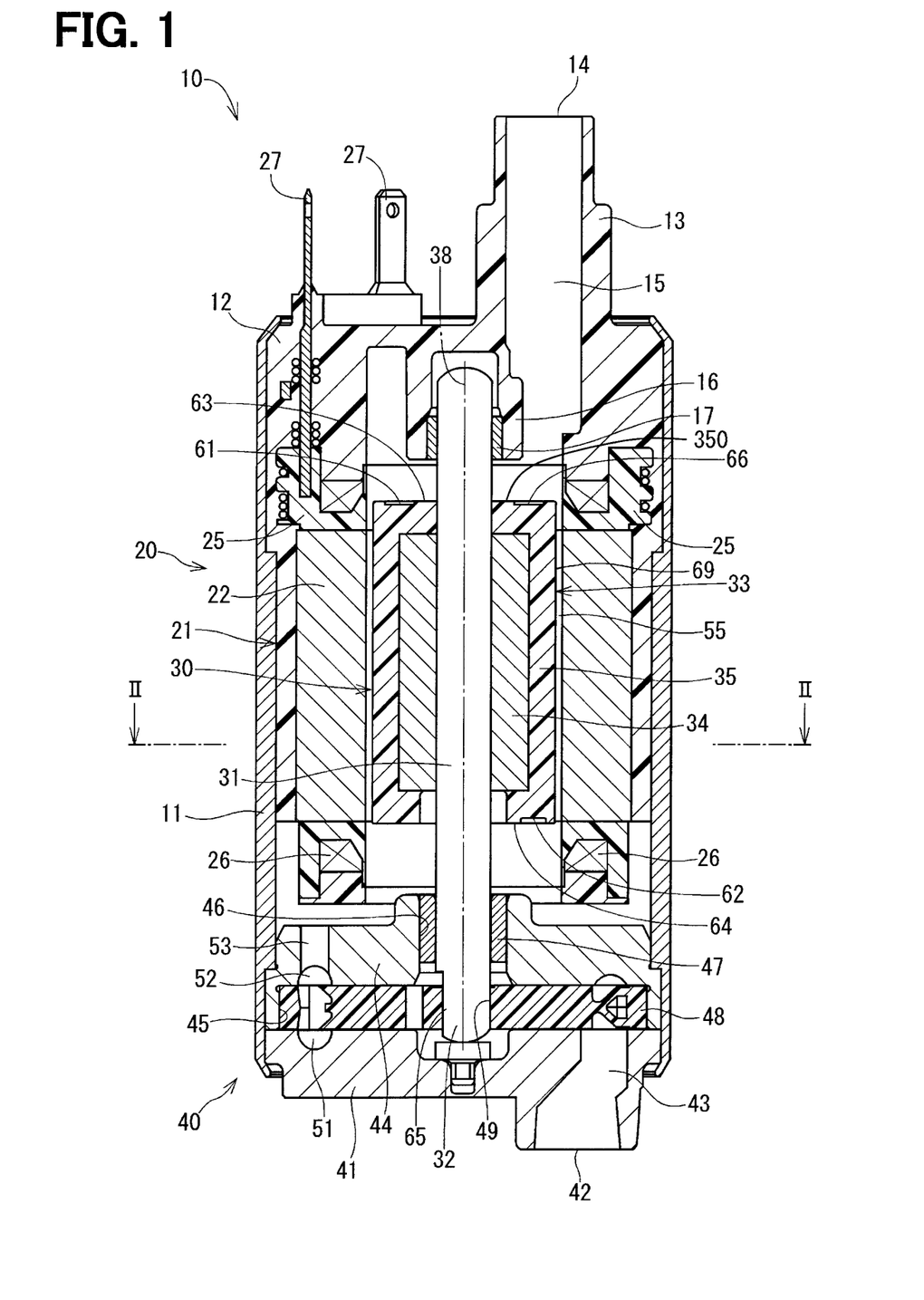
FIG. 1 is a longitudinal cross-sectional view of a fuel pump, in which a rotor of a first embodiment of the present disclosure is applied.

A rotor of a first embodiment of the present disclosure is applied to a fuel pump 10 shown in FIG. 1. The fuel pump 10 is an in-tank pump that is installed in a fuel tank (not shown). The fuel pump 10 draws fuel from the fuel tank through a suction port 42 shown at a lower side in FIG. 1 and discharges the drawn fuel to an internal combustion engine through a discharge port 14 shown at an upper side in FIG. 1.

Figure 2:
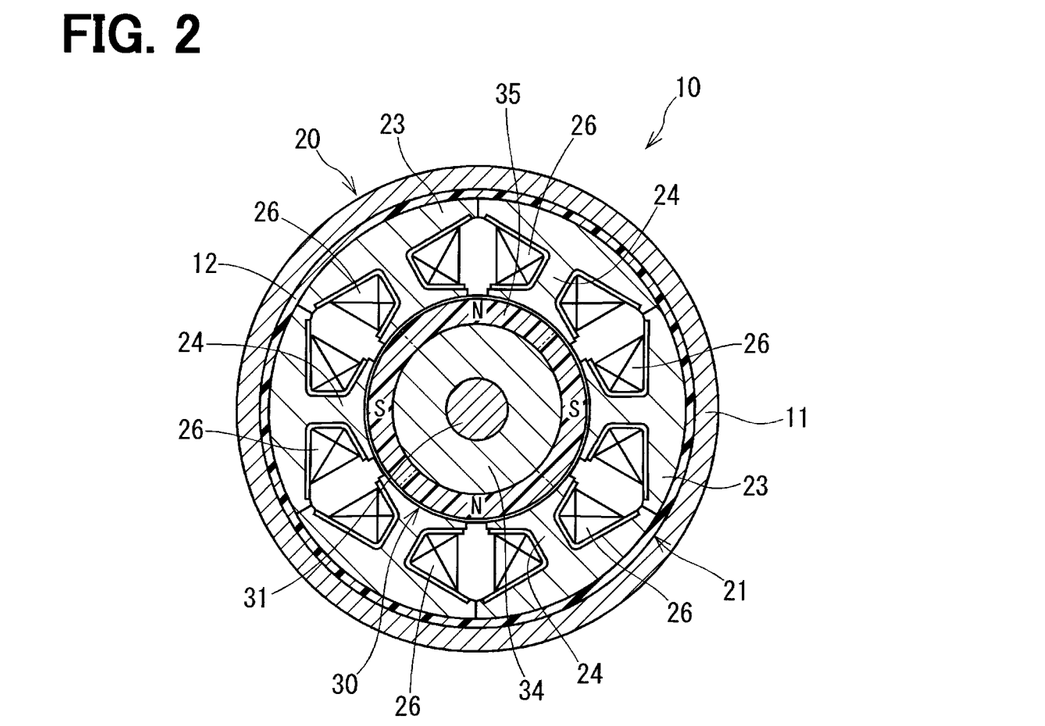
FIG. 2 is a cross sectional view taken along line II-II in FIG. 1.

First of all, an entire structure of the fuel pump 10 will be described with reference to FIGS. 1 and 2.

The fuel pump 10 includes a motor arrangement 20 and a pump arrangement 40. An outer shell of the fuel pump 10 includes a housing 11, a pump cover 41 and a cover end 12. In the following description of the fuel pump 10, the upper side of FIG. 1 will be referred to as a discharge port 14 side, and the lower side of FIG. 1 will be referred to as a suction port 42 side.

(Outer Shell)

The housing 11 is configured into a cylindrical tubular form.

The pump cover 41 closes the suction port 42 side end part of the housing 11. The pump cover 41 is fixed to the housing 11 by radially inwardly crimping a peripheral edge of the housing 11 against the pump cover 41.

The cover end 12 closes the discharge port 14 side end part of the housing 11. The cover end 12 is fixed to the housing 11 by radially inwardly crimping a peripheral edge of the housing 11 against the cover end 12. A tubular portion 13, which projects upwardly in FIG. 1, is formed at an outer side of the cover end 12. The discharge port 14 opens in an end part of the tubular portion 13. A discharge passage 15, which is communicated with the discharge port 14, is formed in the inside of the tubular portion 13. A tubular portion 16, which projects downwardly in FIG. 1, is formed in the inside of the cover end 12. A bearing 17 is fitted in the inside of the tubular portion 16.

(Motor Arrangement)

The motor arrangement 20 corresponds to a brushless motor of the present disclosure and includes a stator 21 and a rotor 30.

The stator 21 is received in the inside of the housing 11 and includes a stator core 22, an insulator 25, windings 26 and terminals 27.

The stator core 22 is made of a magnetic material and forms a yoke 23, which is configured into a tubular form, and a plurality of teeth 24, which radially inwardly project from the yoke 23. The windings 26 are wound around teeth 24 through the insulator 25. In the present embodiment, the windings 26 include a U-phase winding, a V-phase winding and a W-phase winding and are connectable to an external control device through the three terminals 27 (one is not depicted). The insulator 25 is resin, which is molded integrally with the cover end 12 after completion of a winging operation of the windings 26.

The rotor 30 is rotatably received in the inside of the stator 21 and includes a shaft 31 and a rotor core 33.

The shaft 31 is made of metal and is rotatably supported by the bearing 17 and a bearing 47 described later. An outer wall 310 of one end portion 32 of the shaft 31 located at an axial end of the shaft 31 is partially cut to have a D-shape cross section. The rotor core 33 is configured into a tubular form and is fitted to the shaft 31, so that the rotor core 33 is fixed to the shaft 31. In the present embodiment, the rotor core 33 includes an inner core 34 and a permanent magnet 35. The inner core 34 is press fitted to the shaft 31. The permanent magnet 35 is placed on a radially outer side of the inner core 34. The permanent magnet 35 includes a plurality of magnetic poles that are arranged one after another in a circumferential direction.

The motor arrangement 20, which is constructed in the above-described manner, generates a rotating magnetic field and rotates the rotor 30 when an electric current having a corresponding phase difference is conducted through the respective phase windings among the windings 26 of the stator 21.

(Pump Arrangement)

The pump arrangement 40 includes the pump cover 41, a pump casing 44 and an impeller 48.

The pump cover 41 forms the outer shell of the fuel pump 10 and also forms the pump arrangement 40. The suction port 42 opens at the lower side of the pump cover 41. A suction passage 43, which is communicated with the suction port 42, is formed in the inside of the pump cover 41.

The pump casing 44 is configured into a tubular form having a bottom. The pump casing 44 is placed between the pump cover 41 and the stator 21 and defines a pump chamber 45 between the pump casing 44 and the pump cover 41. A through-hole 46 is formed in a center part of the pump casing 44 to extend through the pump casing 44 in a plate thickness direction of the pump casing 44. The bearing 47 is fitted into the through-hole 46.

The impeller 48 is a vaned rotating circular disk made of resin and is received in the pump chamber 45. A hole 49 is formed in a center part of the impeller 48 to extend through the impeller 48 in a plate thickness direction of the impeller 48. The hole 49 is configured into a D-shape that corresponds to the one end portion 32 of the shaft 31. The one end portion 32 of the shaft 31 is fitted into the hole 49, so that the impeller 48 is joined to the shaft 31 in a manner that enables transmission of rotation therebetween.

A circumferential groove 51, which is communicated with the suction passage 43, is formed in the impeller 48 side wall portion of the pump cover 41. A circumferential groove 52 is formed in the impeller 48 side wall portion of the pump casing 44. A passage 53, which passes through the circumferential groove 52 and extends through the pump casing 44 in the plate thickness direction of the pump casing 44, is formed in the inside of the pump casing 44.

In the pump arrangement 40, which is constructed in the above-described manner, the fuel is guided from the fuel tank to the circumferential groove 51 through the suction port 42 when the impeller 48 is rotated by the motor arrangement 20. The fuel, which is guided to the circumferential groove 51, is pressurized through the rotation of the impeller 48 and is guided to the circumferential groove 52. The pressurized fuel is guided to the discharge passage 15 through the passage 53 and a fuel passage 55 formed between the rotor 30 and the stator 21 and is discharged from the discharge port 14.

Next, the characteristic construction of the rotor 30 will be described with reference to FIGS. 3 to 11.

(Bonded Magnet)

As shown in FIGS. 3 to 6, the permanent magnet 35 of the rotor 30 is a bonded magnet that is formed through molding of a mixture material that is a mixture of thermoplastic resin, such as PPS (polyphenylene sulfide), and magnetic powder. In the present embodiment, a neodymium bonded magnet is used as the bonded magnet.

(Balance Correcting Portion)

The permanent magnet 35 includes recesses 61, 62 in an outer wall 350. The recesses 61, 62 serve as balance correcting portions (balance correcting means) for correcting a dynamic balance of the rotor 30. In the outer wall 350 of the permanent magnet 35, an end surface, which is axially placed on a side that is opposite from the one end portion 32 of the shaft 31, is defined as a first end surface 63, and another end surface, which is axially placed on a side where the one end portion 32 of the shaft 31 is present, is defined as a second end surface 64. The first recess 61 is formed in the first end surface 63, and the second recess 62 is formed in the second end surface 64. The first recess 61 and the second recess 62 are formed at the time of molding the permanent magnet 35. Furthermore, in the outer wall 350 of the permanent magnet 35, an outer peripheral surface 69 connects between the first end surface 63 and the second end surface 64. The first end surface 63, the second end surface 64 and the outer peripheral surface 69 are seamlessly and integrally formed through molding of the permanent magnet 35.

Figure 5:
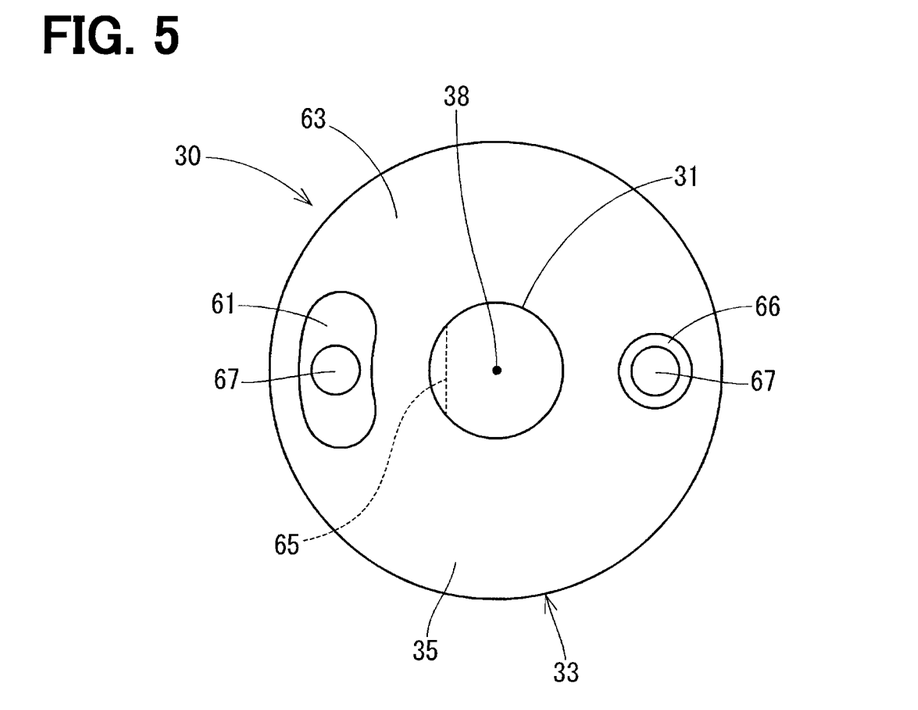
FIG. 5 is a view taken in a direction of an arrow V in FIG. 3.
Figure 6:
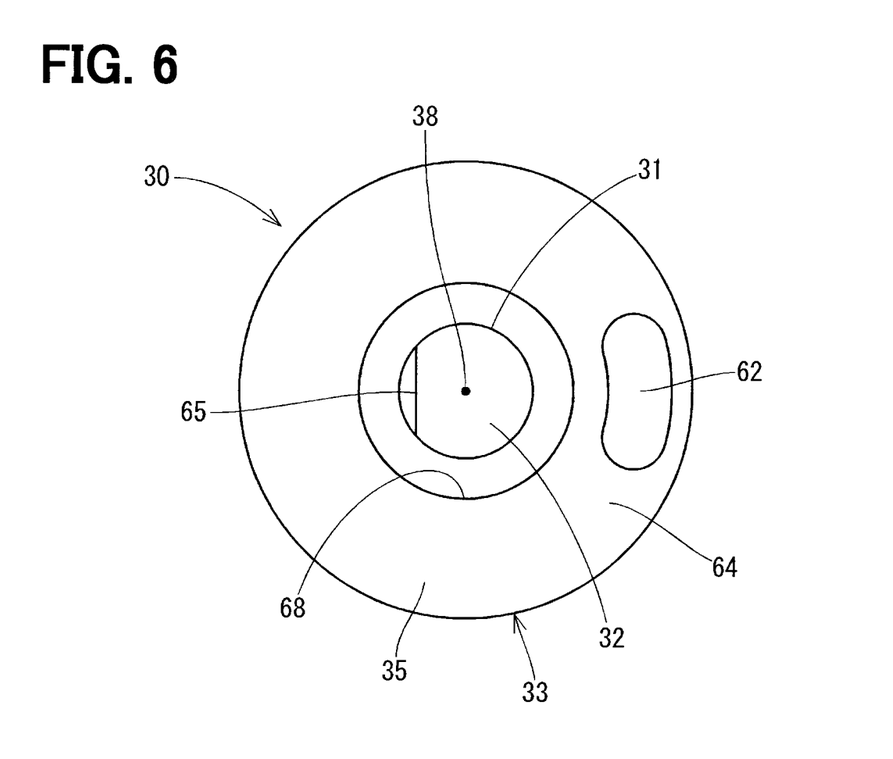
FIG. 6 is a view taken in a direction of an arrow VI in FIG. 3.

As shown in FIG. 5, in one axial view of the permanent magnet 35, the first recess 61 is located on a side of a central axis 38 of the shaft 31 where a planar surface part 65 of the one end portion 32 of the shaft 31 is placed. Furthermore, as shown in FIG. 6, in the other axial view of the permanent magnet 35, the second recess 62 is located on an opposite side of the central axis 38 of the shaft 31, which is opposite from the planar surface part 65 of the one end portion 32 of the shaft 31.

The first recess 61 and the second recess 62 are arcuate grooves that extend in the circumferential direction. A width, a length and a depth of each of the first recess 61 and the second recess 62 are obtained and determined in advance through experiments or simulations to eliminate the dynamic unbalance of the rotor 30.

(Gate Trace)

Besides the first recess 61, a hole 66 is formed in the first end surface 63 of the permanent magnet 35 on the opposite side of the central axis 38, which is opposite from the first recess 61. A gate trace 67 is formed in each of a bottom of the first recess 61 and a bottom of the hole 66. That is, a gate, which functions as a flow inlet of the material (the mixture material that is the mixture of the thermoplastic resin and the magnetic powder) at the time of molding the permanent magnet 35, is formed at locations, which respectively coincide with the location of the bottom of the first recess 61 and the location of the bottom of the hole 66. A shape of the gate trace 67, which is left at each of the bottom of the first recess 61 and the bottom of the hole 66, coincides with a shape of the gate 78.

(Molding of Permanent Magnet)

Figure 7:
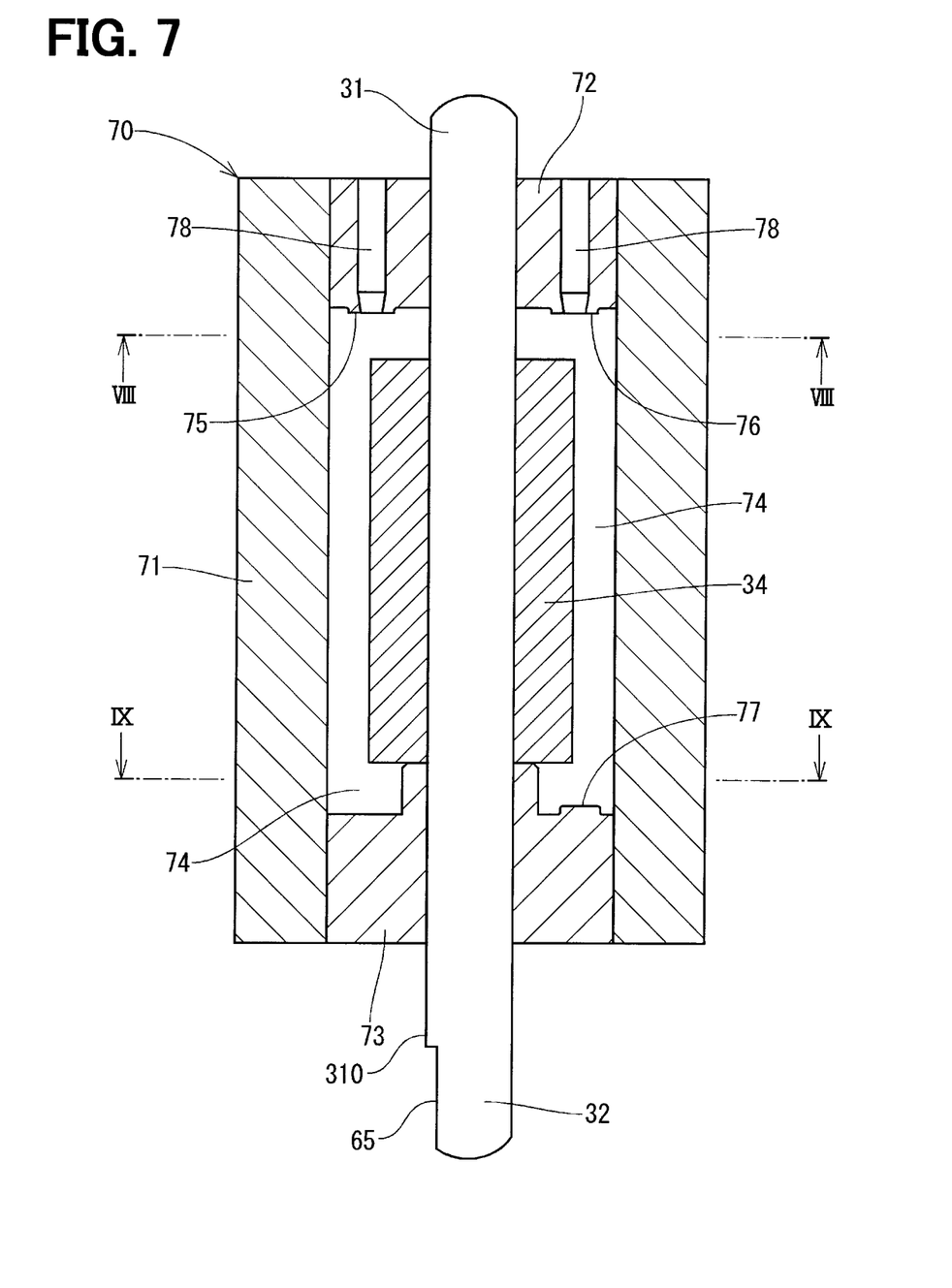
FIG. 7 is a descriptive view for describing a first stage at the time of molding a permanent magnet of FIG. 3.

At the time of manufacturing the permanent magnet 35, first of all, an assembly of the shaft 31 and the inner core 34 is placed in a mold (molding die) 70, as shown in FIG. 7.

Figure 8:
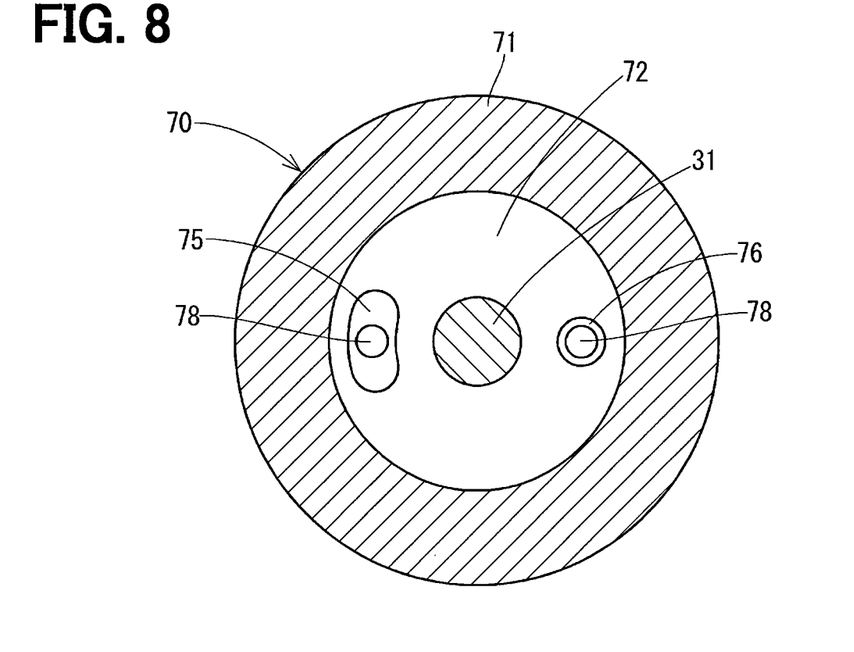
FIG. 8 is a cross sectional view taken along line VIII-VIII in FIG. 7.
Figure 9:
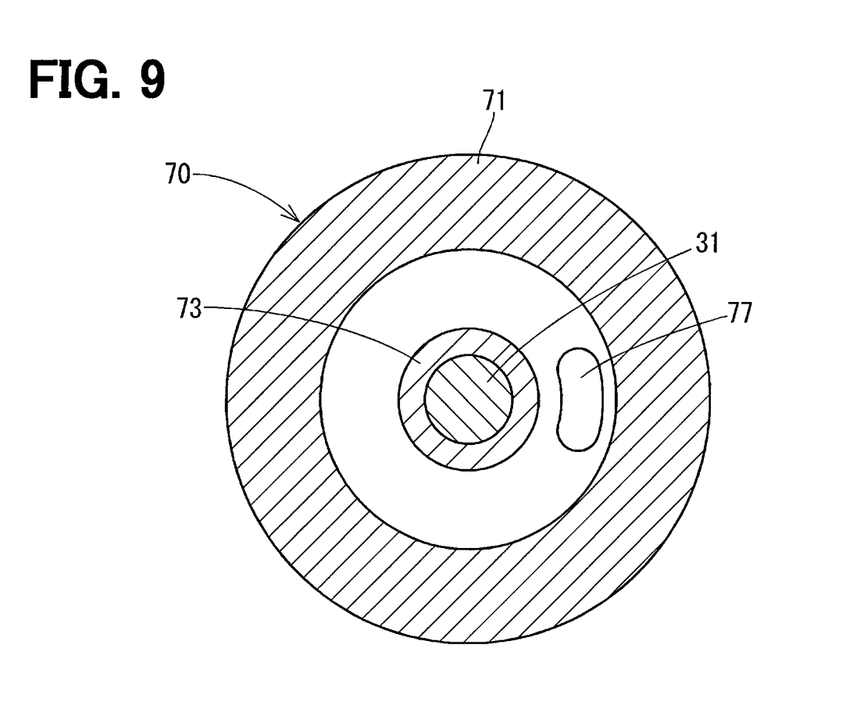
FIG. 9 is a cross-sectional view taken along line IX-IX in FIG. 7.

The mold 70 includes a first mold part 71, which is configured into a tubular form, a second mold part 72, which is placed at one end of the first mold part 71, and a third mold part 73, which is placed at the other end of the first mold part 71. As shown in FIG. 8, a projection 75, which is configured into an arcuate form corresponding to the first recess 61 of the permanent magnet 35, and a projection 76, which corresponds to the hole 66, are formed in the cavity 74 side wall part of the second mold part 72. Furthermore, as shown in FIG. 9, a projection 77, which is configured into an arcuate form corresponding to the second recess 62 of the permanent magnet 35, is formed in the cavity 74 side wall part of the third mold part 73. As shown in FIGS. 7 and 8, the second mold part 72 has the gates 78, which respectively open at a distal end surface of the projection 75 and a distal end surface of the projection 76.

Figure 10:
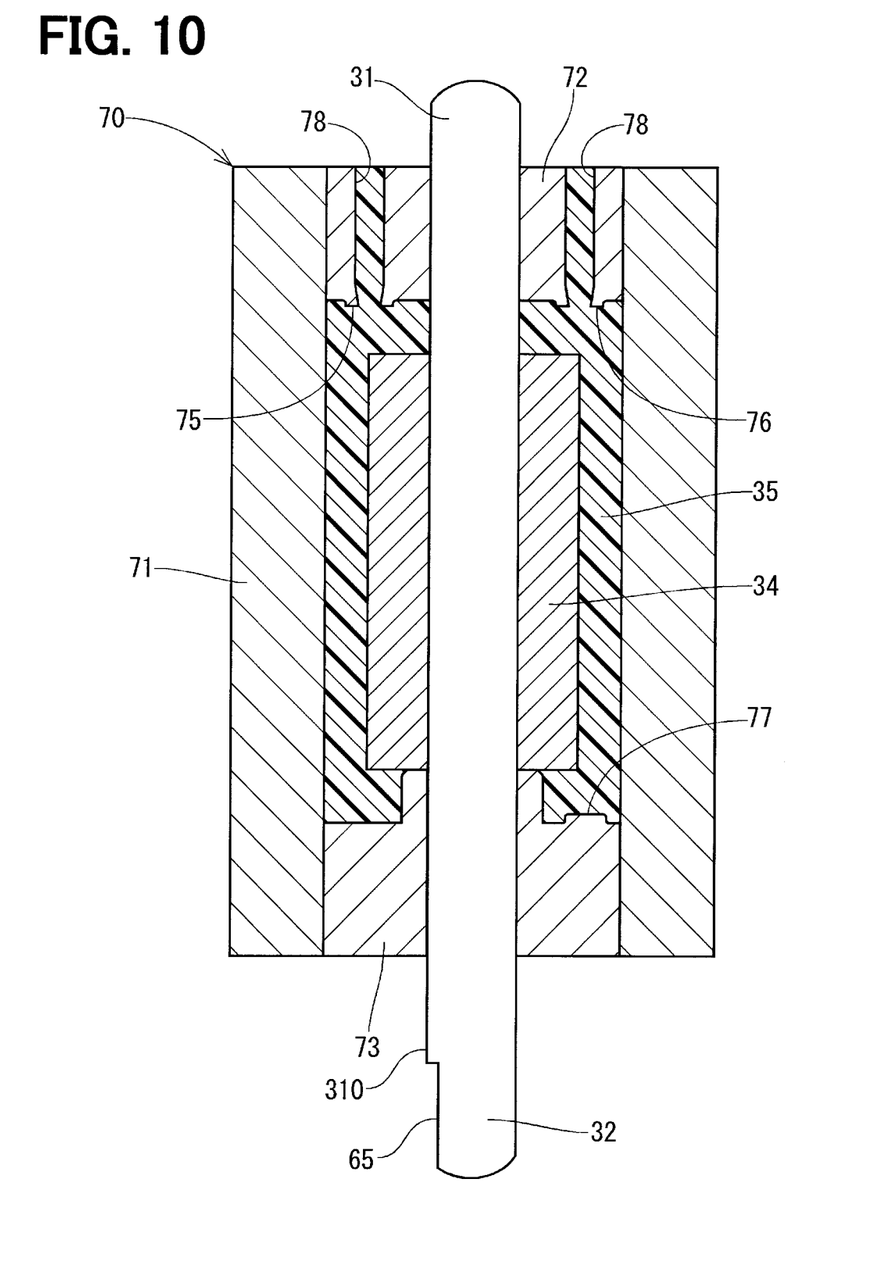
FIG. 10 is a descriptive view for describing a second stage at the time of molding the permanent magnet of FIG. 3.

Next, as shown in FIG. 10, the mixture material in a hot molten state is injected through the gates 78 of the second mold part 72. The mixture material is cooled and solidified after being filled into the cavity 74.

Figure 11:
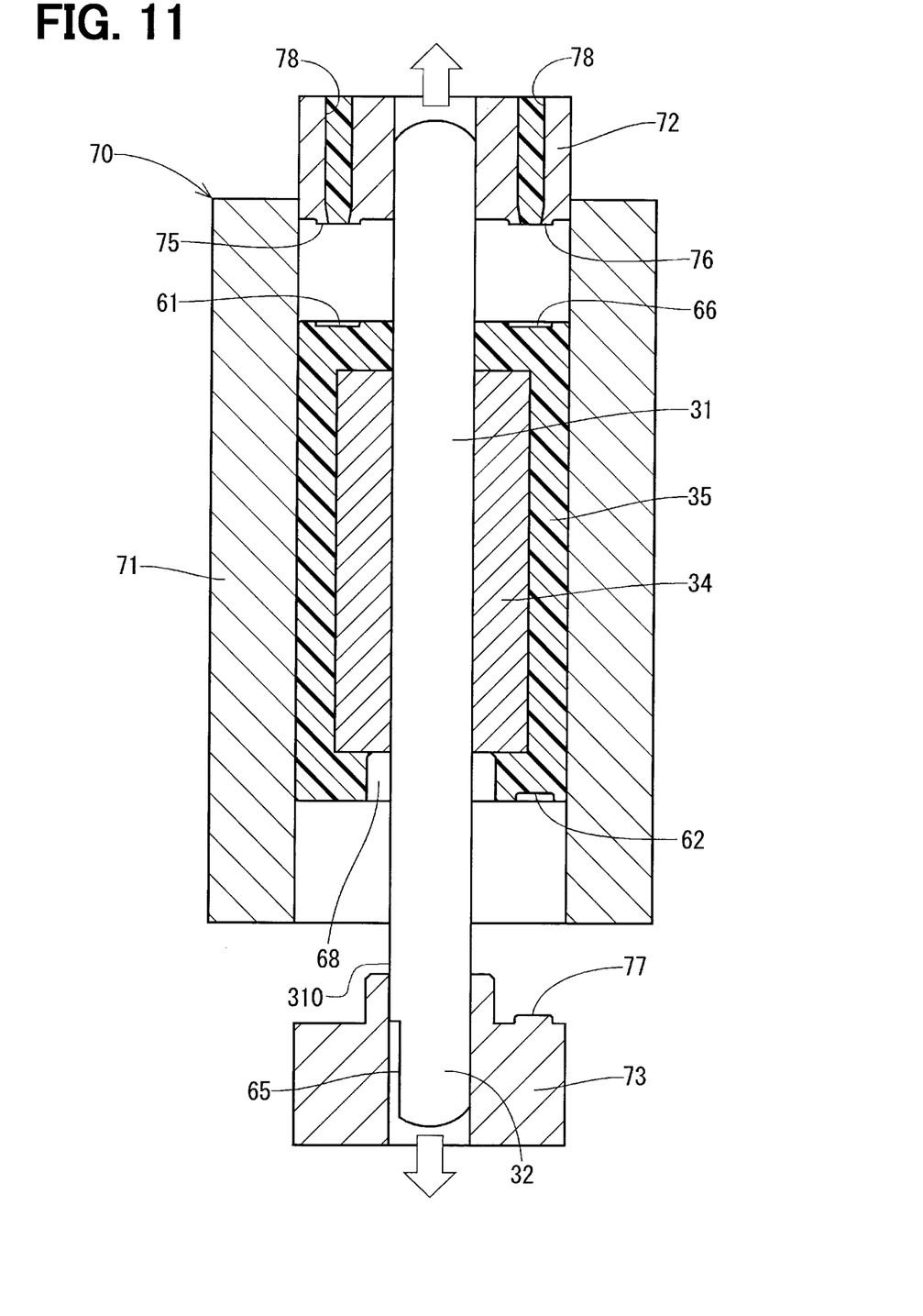
FIG. 11 is a descriptive view for describing a third stage at the time of molding the permanent magnet of FIG. 3.

Next, as shown in FIG. 11, the second mold part 72 and the third mold part 73 are removed from the first mold part 71. At this time, an excess portion(s), which is solidified in the gate 78, is torn off from the solidified product, which is solidified in the cavity 74.

Next, a jig (not shown) is inserted into a hole 68 of the permanent magnet 35, which opens in the second end surface 64, such that the inner core 34 is urged by the jig, and thereby the rotor 30 is removed from the first mold part 71.

Next, the permanent magnet 35 is magnetized, and the manufacturing of the rotor 30 is completed.

Figure 3:
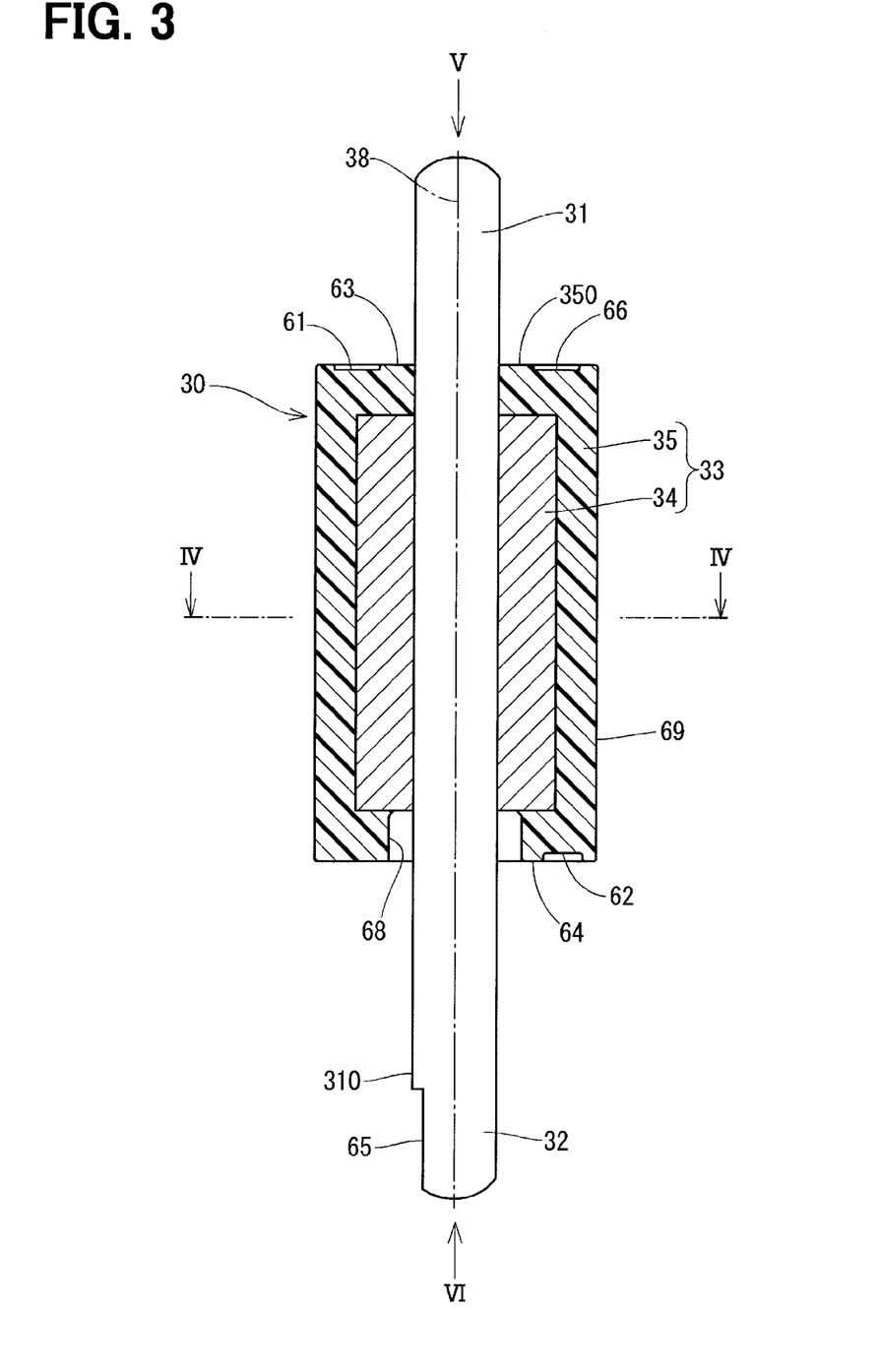
FIG. 3 is a cross-sectional view of the rotor of FIG. 1.
Figure 4:
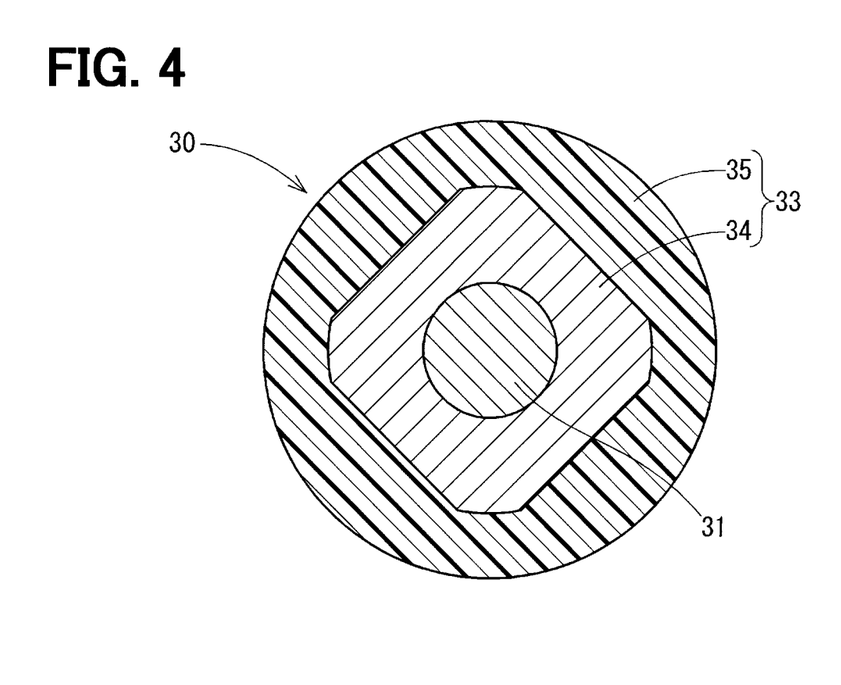
FIG. 4 is a cross-sectional view taken along line IV-IV in FIG. 3.

As discussed above, according to the first embodiment, the permanent magnet 35 of the rotor core 33 of the rotor 30 has the recesses 61, 62, which are formed in the outer wall 350 of the permanent magnet 35 to correct the dynamic balance of the rotor 30, and these recesses 61, 62 are formed by the molding.

Therefore, the dynamic balance of the rotor 30 can be corrected without cutting the permanent magnet 35, so that it is possible to avoid exposure of the magnetic portion, which would be caused by the cutting of the permanent magnet 35. Therefore, it is possible to provide the rotor 30 that has been corrected for the dynamic balance without deteriorating the fuel resistance performance of the rotor 30.

Furthermore, according to the first embodiment, the balance correcting portions (the first recess 61, the second recess 62) are formed at the axial ends, respectively, of the permanent magnet 35.

In the axial view of the permanent magnet 35, the first recess 61 is located on the side of the central axis 38 of the shaft 31 where the planar surface part 65 of the one end portion 32 of the shaft 31 is placed. Furthermore, in the other axial view of the permanent magnet 35, the second recess 62 is located on the opposite side of the central axis 38 of the shaft 31, which is opposite from the planar surface part 65 of the one end portion 32 of the shaft 31.

Thus, it is possible to effectively alleviate the dynamic unbalance of the rotor 30.

Furthermore, according to the first embodiment, the permanent magnet 35 is the bonded magnet that is formed through molding of the mixture material, which is the mixture of thermoplastic resin and the magnetic powder, and the first recess 61 and the second recess 62 are formed at the time of molding the permanent magnet 35.

Therefore, in comparison to the previously proposed technique, it is possible to form the first recess 61 and the second recess 62 without increasing the number of the steps.

Furthermore, according to the first embodiment, the gates 78, which function as the flow inlets of the material at the time of molding the permanent magnet 35, are respectively formed at the location of the bottom of the first recess 61 and the location of the bottom of the hole 66.

Therefore, the gate traces 67 can be formed at the bottom of the first recess 61 and the bottom of the hole 66, respectively, and thereby it is possible to limit hindering of the flow of the fuel at the outside of the permanent magnet 35 by the gate traces 67.

Furthermore, according to the first embodiment, the first recess 61 and the second recess 62 are the arcuate grooves that extend in the circumferential direction.

Therefore, the dynamic balance of the rotor 30 can be most appropriately set by adjusting the circumferential length of the first recess 61 and the circumferential length of the second recess 62.

Second Embodiment

Figure 12:
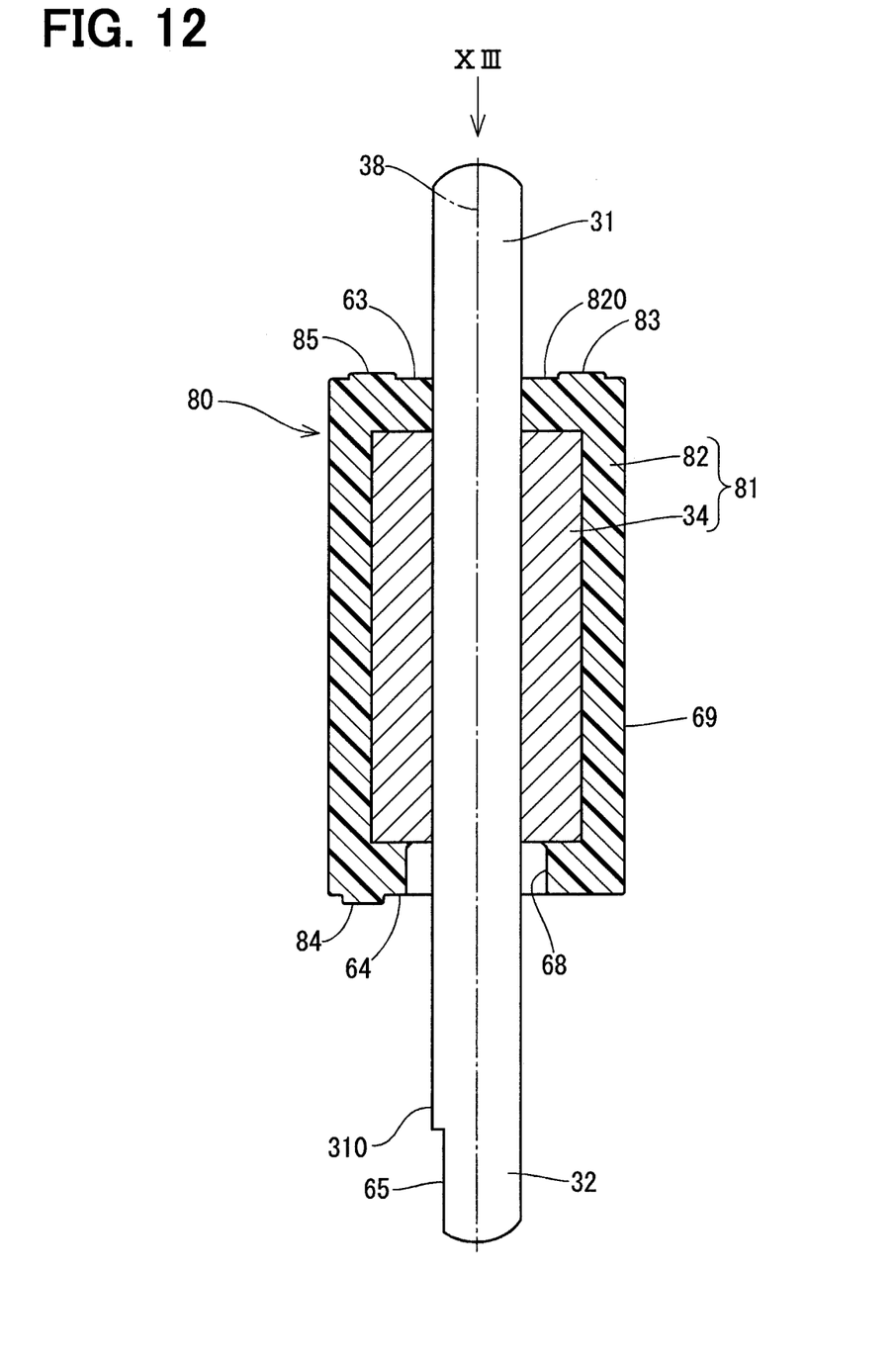
FIG. 12 is a cross-sectional view of a rotor according to a second embodiment of the present disclosure.
Figure 13:
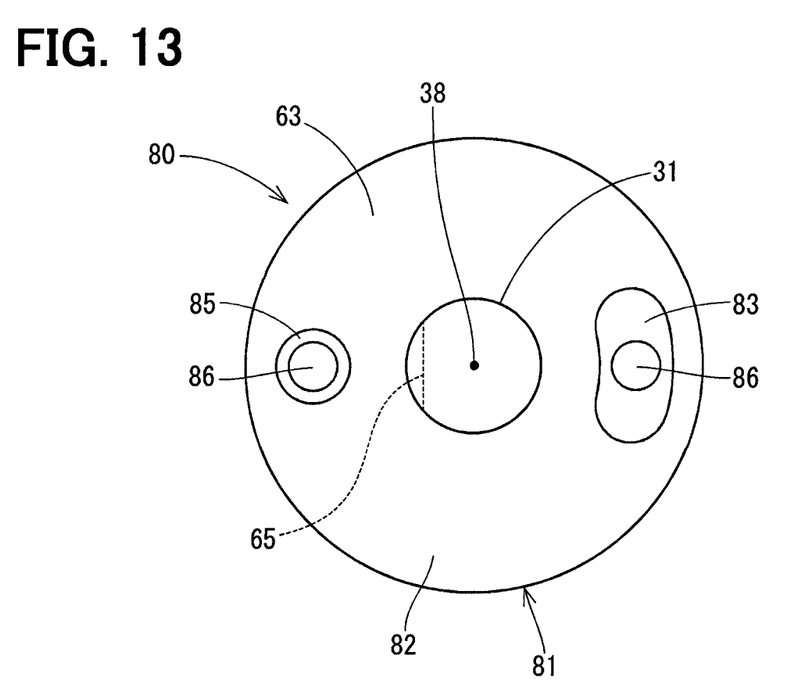
FIG. 13 is a view taken in a direction of an arrow XIII in FIG. 12.

A characteristic structure of a rotor 80 according to a second embodiment of the present disclosure will be described with reference to FIGS. 12 and 13.

(Bonded Magnet)

A permanent magnet 82 of a rotor core 81 of the rotor 80 is a bonded magnet that is formed through molding of a mixture material that is a mixture of thermoplastic resin, such as PPS (polyphenylene sulfide), and magnetic powder. In the present embodiment, a neodymium bonded magnet is used as the bonded magnet.

(Balance Correcting Portion)

The permanent magnet 82 includes projections 83, 84 in an outer wall 820. The projections 83, 84 serve as balance correcting portions (balance correcting means) for correcting a dynamic balance of the rotor 80. Similar to the first embodiment, the first end surface 63, the second end surface 64 and the outer peripheral surface 69 are seamlessly and integrally formed in the outer wall 820. The first projection 83 is formed in the first end surface 63 of the outer wall 820, and the second projection 84 is formed in the second end surface 64 of the outer wall 820. The first projection 83 and the second projection 84 are formed at the time of molding the permanent magnet 82.

In the axial view of the permanent magnet 82, the first projection 83 is located on the opposite side of the central axis 38 of the shaft 31, which is opposite from the planar surface part 65 of the one end portion 32 of the shaft 31. Furthermore, in the other axial view of the permanent magnet 82, the second projection 84 is located on the side of the central axis 38 of the shaft 31 where the planar surface part 65 of the one end portion 32 of the shaft 31 is placed.

The first projection 83 and the second projection 84 are arcuate projections that extend in the circumferential direction. A width, a length and a height of each of the first projection 83 and the second projection 84 are obtained and determined in advance through experiments or simulations to eliminate the dynamic unbalance of the rotor 80.

(Gate Trace)

Besides the first projection 83, a projection 85 is formed in the first end surface 63 of the permanent magnet 82 on the opposite side of the central axis 38, which is opposite from the first projection 83. A gate trace 86 is formed in each of a distal end part of the first projection 83 and a distal end part of the projection 85. Specifically, the gates, which function as the flow inlets of the material at the time of molding the permanent magnet 82, are respectively formed at the location of the distal end part of the first projection 83 and the location of the distal end part of the projection 85.

As discussed above, even in the second embodiment, in which the balance correcting portions are formed by the projections 83, 84, similar to the first embodiment, it is possible to provide the rotor 80 that has been corrected for the dynamic balance without deteriorating the fuel resistance performance of the rotor 80.

Third Embodiment

Figure 14:
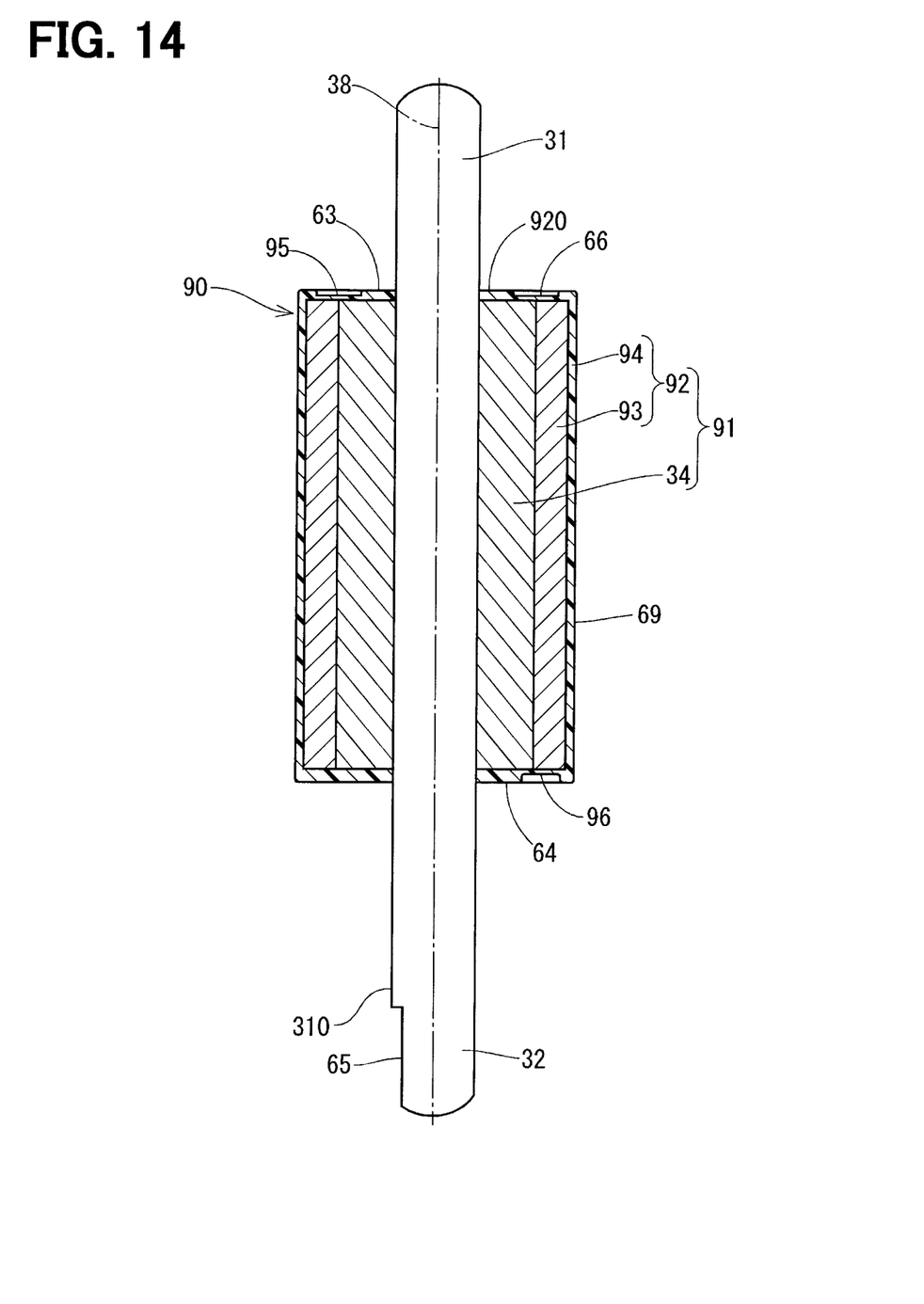
FIG. 14 is a cross-sectional view of a rotor according to a third embodiment of the present disclosure.

A rotor 90 according to a third embodiment of the present disclosure will be described with reference to FIG. 14.

A permanent magnet 92 of a rotor core 91 of the rotor 90 is formed by coating a sintered magnetic body 93 with a protective film 94 made of resin (a resin material). The protective film 94 is formed as follows. That is, an integrated body, in which the sintered magnetic body 93 is installed to the radially outer side of the inner core 34, is placed in a mold, and the resin in a hot molten state is injected into the mold. The protective film 94 forms an outer wall 920 of the permanent magnet 92.

The protective film 94 has a first recess 95 and a second recess 96, which are formed at the time of molding the protective film 94. The first recess 95 and the second recess 96 are similar to the first recess 61 and the second recess 62 of the first embodiment. Specifically, the first end surface 63, the second end surface 64 and the outer peripheral surface 69 are seamlessly and integrally formed in the outer wall 920 of the permanent magnet 92, which is formed by the protective film 94. The first recess 95 is formed in the first end surface 63, and the second recess 96 is formed in the second end surface 64.

According to the third embodiment, similar to the first embodiment, it is possible to provide the rotor 90 that has been corrected for the dynamic balance without deteriorating the fuel resistance performance of the rotor 90.

OTHER EMBODIMENTS

In another embodiment of the present disclosure, the first recess and the second recess are not necessarily configured into the arcuate grooves, respectively. For example, the first recess and/or the second recess may be configured into a linear groove or a dot shape hole. Furthermore, a transverse cross-sectional shape of the first recess and a transverse cross-sectional shape of the second recess are not necessarily configured into a rectangular shape. For instance, the transverse cross-sectional shape of the first recess and/or the transverse cross-sectional shape of the second recess may be configured into a semi-spherical shape.

In another embodiment of the present disclosure, the rotor core may be formed only with the permanent magnet without having the inner core.

In another embodiment of the present disclosure, the cross sectional shape of the one end portion of the shaft can be any circular shape, which is other than the D-shape, as long as the shaft can be joined to the impeller in a manner that enables transmission of the rotation therebetween.

In another embodiment of the present disclosure, the number of the magnetic poles of the rotor may be other than four, and the number of the slots of the stator may be other ant six.

In another embodiment of the present disclosure, the inner core is made of magnetic steel plates, which are stacked one after another in the axial direction. The present disclosure is not limited the above embodiments, and the above embodiments may be modified in various ways without departing from the principle of the present disclosure.

The invention claimed is:

1. A rotor for a brushless motor that rotates an impeller of a fuel pump, the rotor comprising:
a shaft that is configured into a rod form, wherein a cross-section of one end portion of the shaft located at an axial end of the shaft has a non-circular shape, and the shaft is connectable with the impeller through fitting of the one end portion to the impeller, and
a rotor core that is configured into a tubular form and is securely fitted to the shaft, wherein the rotor core includes a permanent magnet, and the permanent magnet has a plurality of magnetic poles, which are arranged one after another in a circumferential direction, and first aid second recesses that are molded in the permanent magnet; wherein:
the one end portion of the shaft has a planar surface part in a part of an outer wall of the one end portion to have a cross section that is configured into a D-shape,
an end surface of the permanent magnet, which is axially placed on a side that is opposite from the one end portion of the shaft, forms a first end surface;

another end surface of the permanent magnet, which is axially placed on a side where the one end portion of the shaft is present, forms a second end surface;

the first recess and the second recess are respectively formed in the first end surface and the second end surface of the permanent magnet to respectively serve as a first balance correct portion and a second balance correction portion, which correct a dynamic balance of the rotor in view of asymmetric mass distribution of the one end portion of the shaft caused by the D-shape of the cross section of the one end portion of the shaft;

when the permanent magnet is axially viewed, the first recess is located on a side of a central axis of the shaft where the planar surface part of the one end portion of the shaft is located; and when the permanent magnet is axially viewed the second recess is located on an opposite side of the central axis of the shaft, which is opposite from the planar surface part of the one end portion of the shaft.

2. The rotor according to claim 1, wherein:

the permanent magnet is a bonded magnet that is formed through molding of a mixture material, which is a mixture of resin and magnetic powder; and is the first recess and the second recess are formed at a time of molding of the permanent magnet.

3. The rotor according to claim 2, wherein a gate trace, which is a trace of a gate that forms a flow inlet of the mixture material at the time of molding of the permanent magnet, is provided at a location that coincides with a location of one of the first recess and the second recess.

4. The rotor according to claim 1, wherein:

the permanent magnet has a sintered magnetic body that is coated with a protective film made of resin;

the protective film is formed through molding of the resin; and the first recess and the second formed at a time of molding of the protective film.

5. The rotor according to claim 4, wherein a gate trace, which is a trace of a gate which forms a flow inlet of the resin at the time of molding of the protective film of the permanent magnet, is provided at a location that coincides with a location of one of the first recess and the second recess.

6. The rotor according to claim 1, wherein each of the first recess and the second recess is circumferentially elongated.

7. The rotor according to claim 1, wherein:

an outer wall of the permanent magnet, which includes the first end surface, the second end surface and an outer surface of the permanent is molded from one of:
  a mixture material of resin and magnetic power; and
  a resin material; and a gate trace, which has a shape that coincides with a shape of a gate of a mold used to mold the outer wall of the permanent magnet, is formed in one of the first recess and the second recess.

8. The rotor according to claim 1, wherein the first recess and the second recess extend arcuately in a circumferential direction about the central axis of the shaft.

* * * * *